(12) United States Patent  
Pelekhaty et al.

(10) Patent No.: US 9,413,520 B2  
(45) Date of Patent: Aug. 9, 2016

(54) OPTICAL TRANSCEIVER AND METHOD WITH CHANNEL BINDING, CLOCK FORWARDING, AND INTEGRATE-AND-DUMP RECEIVERS

(71) Applicants: Vladimir Pelekhaty, Baltimore, MD (US); Michael Y. Frankel, Baltimore, MD (US)

(72) Inventors: Vladimir Pelekhaty, Baltimore, MD (US); Michael Y. Frankel, Baltimore, MD (US)

(73) Assignee: Ciena Corporation, Hanover, MD (US)

( * ) Notice: Subject to any disclaimer, the term of this patent is extended or adjusted under 35 U.S.C. 154(b) by 98 days.

(21) Appl. No.: 14/104,534

(22) Filed: Dec. 12, 2013

(65) Prior Publication Data

US 2015/0172040 A1   Jun. 18, 2015

(51) Int. Cl.
| | |
|---|---|
| *H04J 14/02* | (2006.01) |
| *H04B 10/40* | (2013.01) |
| *H04J 7/00* | (2006.01) |
| *H04L 25/14* | (2006.01) |
| *H04L 7/00* | (2006.01) |

(52) U.S. Cl.
CPC ............. *H04L 7/0075* (2013.01); *H04B 10/40* (2013.01); *H04J 7/00* (2013.01); *H04J 14/02* (2013.01); *H04J 14/0226* (2013.01); *H04L 7/0008* (2013.01); *H04L 25/14* (2013.01)

(58) Field of Classification Search
USPC ................. 398/79, 182, 202, 136; 370/535
See application file for complete search history.

(56) References Cited

U.S. PATENT DOCUMENTS 5,652,767 A   7/1997 Kiyonaga et al.

5,773,815 A * 6/1998 Stevens .................. H03F 3/082
250/214 A (Continued)

FOREIGN PATENT DOCUMENTS

| EP | 2648360 A1 | 10/2013 |
|---|---|---|
| WO | 0057582 S1 | 9/2000 |

(Continued)

OTHER PUBLICATIONS

P. Frascella et al., "Transmission of a 288 Gbit/s Ethernet Superchannel over 124 km un-repeatered field-installed SMF," Optical Fiber Communication (OFC), collocated National Fiber Optic Engineers Conference, 2010 Conference on (OFC/NFOEC), OThD2, pp. 1-3, Mar. 21-25, 2010.

(Continued)

*Primary Examiner* — David Payne
*Assistant Examiner* — Omar S Ismail
(74) *Attorney, Agent, or Firm* — Clements Bernard PLLC; Christopher L. Bernard; Lawrence A. Baratta, Jr.

(57) ABSTRACT

An optical transceiver includes N transmitters each transmitting one of N transmitted optically bound channels; a clock forwarding mechanism to transmit a transmitted optical clock signal to an opposing optical receiver; N receivers each receiving one of N received optically bound channels; and a clock recovery mechanism to receive a received optical clock signal from the opposing optical transmitter. A method and photonically integrated system are also disclosed. The optical transceiver, method, and system optimize system design of WDM highly parallelized transceivers with optical bound channels, a simplified clocking architecture, and boosted receiver sensitivity. The optical transceiver, method, and system include clock recovery followed by data recovery and can utilize integrate-and-dump optical receivers with a recovered clock.

16 Claims, 5 Drawing Sheets

(56) References Cited

U.S. PATENT DOCUMENTS

| | | | |
|---|---|---|---|
| 6,243,175 | B1 | 6/2001 | Pelekhaty et al. |
| 7,061,939 | B1* | 6/2006 | Chengson .............. H04L 25/14 370/503 |
| 7,310,459 | B1 | 12/2007 | Rahman |
| 7,512,343 | B2 | 3/2009 | Sridhar et al. |
| 8,498,542 | B2 | 7/2013 | Frankel et al. |
| 2002/0012143 | A1* | 1/2002 | Graves .............. H04Q 11/0005 398/87 |
| 2003/0076562 | A1* | 4/2003 | Shin .............. H04L 7/0008 398/139 |
| 2006/0024065 | A1* | 2/2006 | Von Lerber .......... H04B 10/299 398/155 |
| 2006/0127100 | A1 | 6/2006 | Frankel et al. |
| 2008/0107422 | A1 | 5/2008 | Cole |
| 2009/0022497 | A1* | 1/2009 | Mateosky .............. H04B 10/40 398/135 |
| 2011/0013911 | A1 | 1/2011 | Alexander et al. |
| 2011/0142174 | A1* | 6/2011 | Park .............. H04B 1/7183 375/340 |
| 2011/0255870 | A1 | 10/2011 | Grigoryan et al. |
| 2012/0039606 | A1 | 2/2012 | Pelekhaty et al. |
| 2012/0044917 | A1* | 2/2012 | O'Keeffe .............. H04B 7/0408 370/338 |
| 2012/0213521 | A1* | 8/2012 | Zhang .............. H04J 14/02 398/79 |
| 2013/0128330 | A1 | 5/2013 | Frankel et al. |
| 2013/0209091 | A1 | 8/2013 | Mateosky et al. |
| 2013/0287397 | A1 | 10/2013 | Frankel et al. |
| 2014/0029951 | A1* | 1/2014 | Handelman .............. H04J 14/02 398/91 |
| 2014/0185125 | A1* | 7/2014 | Kanter .............. G02F 1/21 359/279 |

FOREIGN PATENT DOCUMENTS

| | | |
|---|---|---|
| WO | 02067521 A1 | 8/2002 |
| WO | 2008106626 A1 | 9/2008 |

OTHER PUBLICATIONS

M. Hochberg et al., "Silicon Photonics: the next fabless semiconductor industry," IEEE Solid-State Circuits Magazine, vol. 5, No. 1, pp. 48-58, Mar. 2013.

Monolithic phase-locked loops and clock recovery circuits: theory and design / edited by Behzag Razavi, New York, IEEE Press, 1996.

R. P. Jindal, "Silicon MOS amplifier operation in the integrate and dump mode for gigahertz band lightwave communication systems," Journal of Lightwave Technology, vol. 8, No. 7, pp. 1023-1026, Jul. 1990.

S. Sidiropoulus and M. Horowitz, "Current Integrating Receivers for High Speed System Interconnects," IEEE Custom Integrated Circuits Conference—CICC, May 1995.

A. Emami-Neyestanak, et al., "A 1.6Gb/s, 3 mW CMOS Receiver for Optical Communication," Symposium on VLSI Circuits—VLSIC, 2002, pp. 84-88.

A. Emami-Neyestanak, et al., "CMOS Transceiver with Baud Rate Clock Recovery for Optical Interconnects," Symposium on VLSI Circuits—VLSIC, 2004, pp. 410-413.

S. Palermo, et al., "A 90 nm CMOS 16 Gb/s Transceiver for Optical Interconnects," IEEE Journal of Solid-State Circuit, vol. 43, No. 5, pp. 1235-1246, May 2008.

M. Georgas, at al., "Addressing link-level design tradeoffs for integrated photonics interconnects," IEEE Custom Integrated Circuits Conference—CICC, 2011.

M. Georgas, at al., "A monolithically-integrated optical receiver in standard 45-nm SOI," IEEE Journal of Solid-State Circuit, vol. 47, No. 7, pp. 1693-1702, May 2012.

T. D. Gathman and J. F. Buckwalter, "A 45-nm SOI CMOS Integrate-and-Dump Optical Sampling Receiver," IEEE Transactions on Circuits and Systems—I: Regular Papers, vol. 60, No. 2, Feb. 2013.

J. Savoj and B. Razavi, "A CMOS interface circuit for detection of 1.2 Gb/s RZ data," IEEE International Solid-State Circuits Conference, 1999, TP 16.3.

Marvin K. Simon, "Nonlinear analysis of an absolute value type of an early-late gate bit synchronizer," IEEE Transactions on Comm. Technol., vol. COM-18, No. 5, Oct. 1970.

C. R. Giles and J. M. Kahn, "1 Gbit/s integrate-and-dump filter for digital communication systems," Electron. Lett., vol. 25, No. 3, pp. 212-214, Feb. 2, 1989.

Eduard Säckinger, "TheTransimpedance Limit," IEEE Transactions on Circuits and Systems—I: Regular Papers, vol. 57, No. 8, Aug. 2010.

Broadband optical modulators: science, technology, and applications / edited by Antao Chen and Edmond Murphy, CRC Press, 2012, p. 336.

C. T. DeRose, at al., "Ultra compact 45 GHz CMOS compatible Germanium waveguide photodiode with low dark current," Optics Express, vol. 19, No. 25, pp. 24897-24904, Dec. 5, 2011.

S. Basiri et al., "A 40 Gb/s Transimpedance Amplifier in 65 nm CMOS," Proceedings of IEEE International Symposium on Circuits and Systems, (ISCAS), 2010, pp. 757-760.

S. B. Amid, "Fully differential, 40Gb/s regulated cascade transimpedance amplifier in 0.13 μm SiGe BiCMOS technology,"IEEE Bipolar/BiCMOSCircuits and Technology meeting (BSCTM), 2010, pp. 33-36.

S. T. Chou, S. H. Huang, Z. H. Hong, and W. Z. Chen, "A 40 Gbps Optical Receiver Analog Front-End in 65 nm CMOS", International Symposium on Circuits and Systems (ISCAS), May 2012.

Cheng Li and Samuel Palermo, "A low-power 26-GHz transformer-baased regulated cascade SiGWE BiCMOS transimpedance amplifier," IEEE Journal of Solid-State Circuit, vol. 48, No. 5, pp. 1264-1275, May 2013.

Georgas et al., "Addressing Link-Level Design Tradeoffs for Integrated Photonic Interconnects," IEEE, 2011, pp. 1-8.

Kazi, Khurram, "Elimination of Clock Recovery and Framing by Transporting Clock, Data and Synchronization Pulse for OC-192 Using WDM," Journal of Lightwave Technology, vol. 13, No. 11, Nov. 1995, pp. 1-8.

Mar. 11, 2015 International Search Report issued in International Patent Application No. PCT/US2014/069028.

\* cited by examiner

OPTICAL TRANSCEIVER AND METHOD WITH CHANNEL BINDING, CLOCK FORWARDING, AND INTEGRATE-AND-DUMP RECEIVERS

FIELD OF THE DISCLOSURE

The present disclosure relates generally to optical networking systems and methods. More particularly, the present disclosure relates to an optical transceiver and method with channel binding, clock forwarding, and integrate-and-dump receivers.

BACKGROUND OF THE DISCLOSURE

Optical links are finding increased use across a number of application spaces, including, for example, chip-chip, board-board, data center/rack-rack, in wide area network (WAN) fiber-optic links, and the like. All of these links and networks are experiencing rapidly increasing growth of capacity. WAN capacity growth is reflected by individual channel data rate scaling from 10 Gbps, to 40 Gbps, to currently deployed 100 Gbps, and to future projections of 1000 Gbps channels. The same capacity growth demand is also observed for shorter interconnects, as demonstrated by active optical cables which currently have >100 Gb of capacity (4×25 G, 10×10 G, etc.), and are starting to scale to 400 Gb capacity (16×25 G, 20×20 G, 40×10 G, etc.). Here, the ever-growing demand for increased bandwidth and channel capacity is being successfully met by Wavelength Division Multiplexing (WDM) evolving into a form of optical bound channels. Channels bound together include a set of optical WDM carriers generated and combined within the same optical module to create a composite line side signal whose capacity can be combined into a higher-data-rate aggregate channel of desired high capacity, and which is brought into service in one operational cycle. Bound channels provide efficient bandwidth scalability and higher composite data rates through extensive channel parallelization, similar to an approach used in multi-core microprocessors. At present, bound channels are utilized in interconnect scenarios at 100 Gbps and above.

Conventional direct-detect WDM optical channels as constituents of an optical bound channel have severe drawbacks. They are power and real estate wasteful due to massive parallel implementation of essentially redundant digital clock and data recovery (CDR) circuitry in every one of the individual channel receiver. Similar power and real estate concerns arise regarding the analog opto-electronic front end of the receivers, which typically uses a transimpedance amplifier (TIA). TIAs also require a high gain-bandwidth product, which has to increase as square of the signal bandwidth growth, and hits so called "transimpedance limit," Eduard Sackinger, "The Transimpedance Limit," IEEE Transactions on Circuits and Systems—I: Regular Papers, vol. 57, no. 8, August 2010, severely complicating process of further receiver bandwidth expansion. In view of imminent integration of photonic optical circuits and associated electronics, the power dissipation and real estate requirements for implementation of optical bound channels become of ultimate importance and cannot be easily satisfied within the architectural solutions inherent to conventional implementation of direct-detect WDM optical channels.

BRIEF SUMMARY OF THE DISCLOSURE

In various exemplary embodiments, an optical transceiver, method, and system optimize system design of WDM highly parallelized transceivers by binding optical channels, simplifying clocking architecture, and boosting receiver sensitivity. The optical transceiver, method, and system include clock recovery followed by data recovery and can utilize integrate-and-dump optical receivers with a recovered clock. In an exemplary embodiment, an optical transceiver includes N transmitters each transmitting N transmitted optically bound channels; a clock forwarding mechanism to transmit a transmitted optical clock signal to an opposing optical transceiver; N receivers each receiving one of N received optically bound channels; and a clock recovery mechanism to receive a received optical clock signal from the opposing optical transceiver. The optical transceiver can further include a multiplexer combining the N transmitted optically bound channels from the N transmitters; and a demultiplexer splitting N received optically bound channels to the N receivers. Optionally, the N transmitters, the clock forwarding mechanism, the N receivers, the clock recovery mechanism, the multiplexer, and the demultiplexer are photonically integrated. The optical transceiver can further include clock distribution and data recovery circuitry coupled to each of the N receivers and the clock recovery mechanism, wherein the clock distribution and data recovery circuitry is configured to recover the received optical clock prior to performing data recovery.

Optionally, the clock forwarding mechanism includes a clock transmitter transmitting the transmitted optical clock signal over a designated clock carrying wavelength; and wherein the clock recovery mechanism includes a clock receiver receiving the received optical clock signal over a designated clock carrying wavelength, wherein the clock receiver is a low-power, low-complexity clock signal receiver relative to the N receivers. Alternatively, the optical transceiver includes an envelope detector tapping a small amount of overall optical power prior to the N receivers and detecting the received optical clock signal with a narrowband and highly sensitive clock photodetector, wherein the received optical clock signal is superimposed as an external or internal small-index modulation of an overall intensity envelope of a whole bound channel from the opposing transceiver. The transmitted optical clock signal and the received optical clock signal can be carried at a much lower sub-harmonic, compared to signal rate of the N transmitters and the N receivers.

The N receivers can include integrate-and-dump optical receivers. The N receivers do not utilize broadband transimpedance amplifiers and data-driven clock recovery. The integrate-and-dump optical receivers can utilize an integration time of about 75% of a bit period providing sufficient time for sampling a value of integrated current and resetting an integrator by discharging an integrating capacitor during the remaining about 25% of the bit period. The N transmitted optically bound channels can include a composite signal X that is includes $Y_1, Y_2, \ldots, Y_N$ parts or segments that are each transmitted on a set of optical carriers on a same optical module by the N transmitters to create a composite line side signal where $Y_1+Y_2+\ldots+Y_N=X$. The optical transceiver can include one of a CFP, CFP2, CFP4, CDFP, CXP, MSA-100GLH, CCRx, QSFP, QSFP+, QSFP2, or 10×10-compliant module. The N transmitters can utilize any of on-off keying, duobinary, differential phase-shift keying, and multi-level formats.

In another exemplary embodiment, a method includes transmitting a composite signal split into N optically bound channels and an optical clock signal associated with the N optically bound channels; receiving the N optically bound channels and the optical clock signal; recovering an optical clock from the optical clock signal; and performing data recovery of the N optically bound channels utilizing the optical clock signal. Optionally, the method further includes transmitting the optical clock signal over a designated clock carrying wavelength; and receiving the optical clock signal over the designated clock carrying wavelength with a clock receiver that is a low-power, low-complexity clock signal receiver relative to a data receiver for the N optically bound channels. Alternatively, the method further includes transmitting the optical clock signal superimposed as an external or internal small-index modulation of an overall intensity envelope of a whole bound channel; and receiving the optical clock signal by tapping a small amount of overall optical power and detecting the optical clock signal with a narrow-band and highly sensitive clock photodetector. The method can further include transmitting the optical clock signal at a much lower sub-harmonic, compared to signal rate of the N optically bound channels. The method can further include receiving the N optically bound channels with N integrate-and-dump receivers. The method can further include utilizing an integration time of about 75% of a bit period providing sufficient time for sampling a value of integrated current and resetting an integrator by discharging an integrating capacitor during the remaining about 25% of the bit period.

In yet another exemplary embodiment, a photonically integrated system includes N transmitters each transmitting N transmitted optically bound channels; a multiplexer combining the N transmitted optically bound channels from the N transmitters; a clock forwarding mechanism to transmit a transmitted optical clock signal to an opposing optical transceiver; N receivers each receiving one of N received optically bound channels; a demultiplexer splitting the N received optically bound channels to the N receivers; and a clock recovery mechanism to receive a received optical clock signal from the opposing optical transceiver.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various exemplary embodiments, an optical transceiver and method is disclosed to optimize system design of WDM highly parallelized transceivers by using optical bound channels, a simplified clocking architecture, and boosted receiver sensitivity. With application of photonic integration technology, highly parallelized transmitter and receiver arrays can be mass produced at low cost, making high-capacity point-point optical links much more feasible. Hence, simplified, efficient and cost effective WDM optical bound-channels disclosed herein can find wide usage in short reach chip-chip, board-board, data center, and metro-type applications. Optically bound channels include a signal X that is includes $Y_1$, $Y_2, \ldots, Y_N$ parts or segments that are each transmitted on a set of optical WDM carriers within the same optical module to create a composite line side signal where $Y_1+Y_2+\ldots+Y_N=X$. For example, optically bound channels can include 10×10 G, 4×25 G, etc. for a 100 G composite signal, 40×10 G, 16×25 G, etc. for a 400 G composite signal, etc. Other variations are also contemplated, and the parts or segments do not necessarily need to each be equal. Again, as described herein, optically bound channels include a set of optical WDM carriers generated and combined on a same optical module to create a composite line side signal whose capacity can be combined into a higher-data-rate aggregate channel of desired high capacity, and which is brought into service in one operational cycle.

A simple and cost effective approach to optical channel binding uses several lower rate WDM channels, which may carry unsophisticated but robust and economic Intensity Modulated Direct-Detected (IMDD), specifically NRZ, formatted signals. An example of this approach is described in P. Frascella et al., "Transmission of a 288 Gbit/s Ethernet Super-channel over 124 km un-repeatered field-installed SMF," Optical Fiber Communication (OFC), collocated National Fiber Optic Engineers Conference, 2010 Conference on (OFC/NFOEC), OThD2, pp. 1-3, 21-25 Mar. 2010. This implementation proves itself very amenable to efficient parallelization through large scale integration on a silicon based photonic technology platform (see, e.g., M. Hochberg et al., "Silicon Photonics: the next fabless semiconductor industry," IEEE Solid-State Circuits Magazine, vol. 5, no. 1, pp. 48-58, March 2013).

In an exemplary embodiment, the optical transceiver and method use optical channel binding such that transmitters share the same timing clock. Advantageously, a single common clock can be transmitted for all bound channels, which minimizes the overhead associated with carrying the clock signal. For example, a low-power, low-complexity clock signal receiver can be used. The clock may be carried at a much lower sub-harmonic, compared to signal rate. Further, the clock may use either a separate channel, or may be superimposed onto existing data channels. Because the optical transceiver and method, at the receiver, recover the clock before data, an integrate-and-dump receiver design may be utilized. The integrate-and-dump receiver provides intrinsically lower noise and is simpler in design, compared to conventional TIA based receivers. Advantageously, some receiver circuit complexity and power may be saved by eliminating broadband TIAs and data-driven clock recovery at the expense of a comparatively modest amount of additional clock transmitter and receiver circuitry. The optical transceiver and method includes improved sensitivity which directly translates into corresponding power savings due to a reduction in laser power in a point-point optical link. The integrate-and-dump receiver is applicable to any direct-detect receiver, and can be used for a variety of modulation formats such as on-off keying (OOK), Duobinary, Differential phase shift keying (DPSK), etc.

Figure 1:
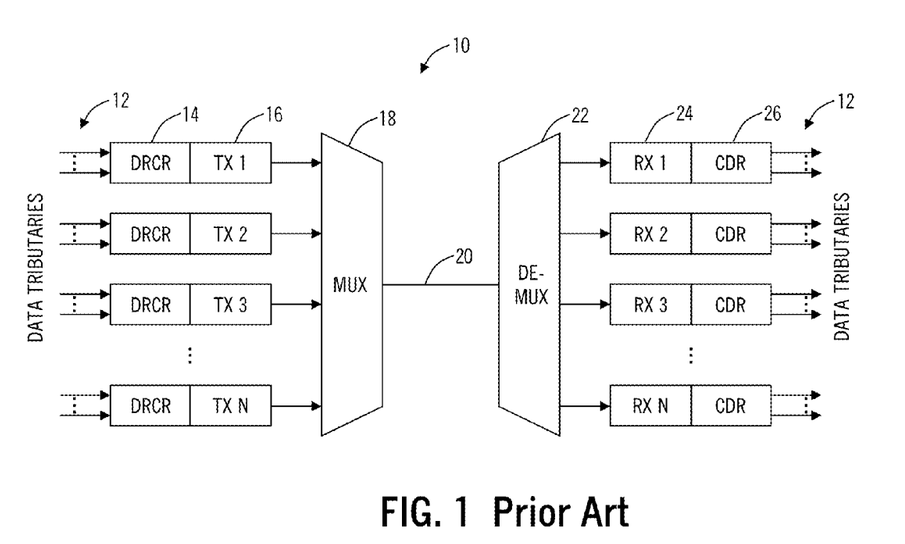
FIG. 1 is a block diagram of a conventional transceiver.

Referring to FIG. 1, in a conventional embodiment, a block diagram illustrates a conventional transceiver 10. The transceiver 10 receives a plurality of data tributaries 12, each being connected to a data retiming and clock recovery (DRCR) block 14 separately. Each of the data tributaries 12 can include individual client signals. The DRCR block 14 operates separately on each of the data tributaries 12 and each DRCR block is connected to a separate transmitter (TX) 16. Here, the transceiver 10 includes N transmitters 16 for a total of N parts or segments of the composite signal. Each of the N transmitters 16 is connected to a multiplexer 18 which can include a WDM multiplexer with each of the N transmitters 16 being a different wavelength and the multiplexer 18 is configured to combine each of the different wavelengths and output to a link 20. The link 20 can include fiber optic cables, intermediate network elements (optical add/drop multiplexers (OADM)), amplifiers, and the like. Note, the data carrying wavelengths can take different optical paths through a network even though the link 20 is shown as a single connection, which may be due to the optical multiplexing/demultiplexing structure, due to intermediate optical add/drop multiplexers, etc.

The link 20 terminates at a demultiplexer 22 which can separate each of the different wavelength channels and provide an output to one of N receivers 24, each of the N receivers corresponding to an associated one of the N transmitters 16. Each of the N receivers 24 provides an output to a clock and data recovery (CDR) block 26 which outputs the data tributaries 12 received from the corresponding end. Each of the N receivers 24 uses an individual CDR block 26 for every channel due to independently sourced clocks of channels originated at the N transmitters 16 by the DRCR blocks 14. The individual channel receivers 24 necessarily see incoming data with slightly different frequencies and continually fluctuating phases. Therefore, each of the N receivers 24 is required to have its own CDR block 26. A separate optical clock transmission for each channel is prohibitively expensive.

Thus, all of the N receivers 24 have their own independent clock sources. While transmitter and receiver clocks are supposed to have the same frequency, in practice the receiver intrinsic clock is never exactly the same frequency as the transmitter's, hence the transmitters 16 and the receivers 24 operate plesiochronously. The resulting frequency offset is usually in parts-per-million (ppm) and translates into a phase-ramp in time domain. Additional circuitry is required in the receivers 24 to extract an exact clock reference from the incoming data, to compensate for this phase drift, and to keep the sampling clock at the center of the symbol interval. All this imposes a burden of excessive parallelized CDR circuitry, especially a Carrier-Recovery part, resulting in elevated complexity and increased circuit power and real estate requirements. Another factor contributing to excessive complexity in the transmitter 10 is a transimpedance amplifier (TIA)-based receiver architecture, which employs TIA front-end stage facing highly demanding limits of gain-bandwidth product, which has to grow as square of the signal bandwidth increase (so called "transimpedance limit"), followed by multiple broadband gain post-TIA stages, all resulting in additional power and real estate requirements.

The embedded clocking architecture of conventional IMDD WDM optical receivers also becomes significantly complicated by its plesiochronous nature. Clock frequency has to be extracted indirectly from the data itself since the OOK/IMDD format usually does not contain a clock tone in its detected RF spectrum. Sophisticated voltage-controlled oscillator (VCO)-based techniques are employed with phase-lock loops (PLL) utilizing a seed clock frequency obtained by detection of the edges of irregular transitions between data zeros and ones as a reference (see, e.g., "Monolithic phase-locked loops and clock recovery circuits: theory and design," edited by Behzag Razavi, New York, IEEE Press, 1996).

Current integrating and integrate-and-dump receivers are known in the art (see, e.g., R. P. Jindal, "Silicon MOS amplifier operation in the integrate and dump mode for gigahertz band lightwave communication systems," Journal of Lightwave Technology, vol. 8, no. 7, pp. 1023-1026, July 1990), and recently are finding some use in data transmission applications. A clock signal can be extracted from the data by the integrating receivers. However, it is complicated in that it requires twice oversampling the bit period for realization of an "early-late" clock recovery technique (see, e.g. Marvin K. Simon, "Nonlinear analysis of an absolute value type of an early-late gate bit synchronizer," IEEE Transactions on Comm. Technol., vol. COM-18, no. 5, October 1970), which compares the results of current integrated for second half of the previous bit and first half of the following bit within either "01" or "10" bit transition pairs (see, e.g., A. Emami-Neyestanak, et al., "A 1.6 Gb/s, 3 mW CMOS Receiver for Optical Communication," Symposium on VLSI Circuits—VLSIC, 2002, pp. 84-88). The sensing signal needed for clock phase correction can be obtained only during irregular transitions between data ones and zeros, similarly to pulse edge detection used in a non-return-to-zero (NRZ) clock recovery algorithm described above. Sampling the integrated current once per bit period requires detection of transitions between at least two consecutive "ones" and at least two consecutive "zeros", corresponding to "0011" and "1100" bit quartets, which occur even more rarely and irregularly than "01" or "10" bit pairs (see, e.g., A. Emami-Neyestanak, et al., "CMOS Transceiver with Baud Rate Clock Recovery for Optical Interconnects," Symposium on VLSI Circuits—VLSIC, 2004, pp. 410-413.)

It may be asked why current optical data receivers, such as the N receivers 24, are based nearly exclusively on TIA designs. There are two key reasons: 1) I&D receivers require an accurate clock for operation. Clock transmission for every single wavelength channel is prohibitively complex and degrades system efficiency; and 2) Signal "dumping" function requires bandwidth which is ~5× of the base symbol rate. Such bandwidth is nearly impossible to achieve in a hybrid-integrated circuit, where a photodetector is wire bonded to the receiver electronics. However, both of the aforementioned constraints disappear in highly parallelized links, which bind multiple wavelength channels, and which use monolithically integrated photodetectors and electronics.

Figure 2:
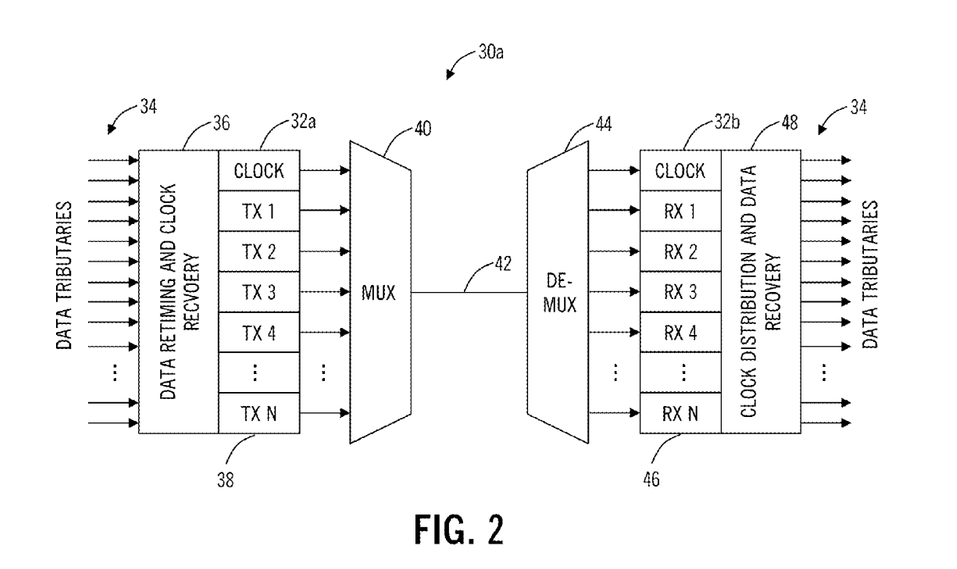
FIG. 2 is a block diagram of a first exemplary embodiment of an optical transceiver with a clock forwarded through a designated clock WDM channel.
Figure 3:
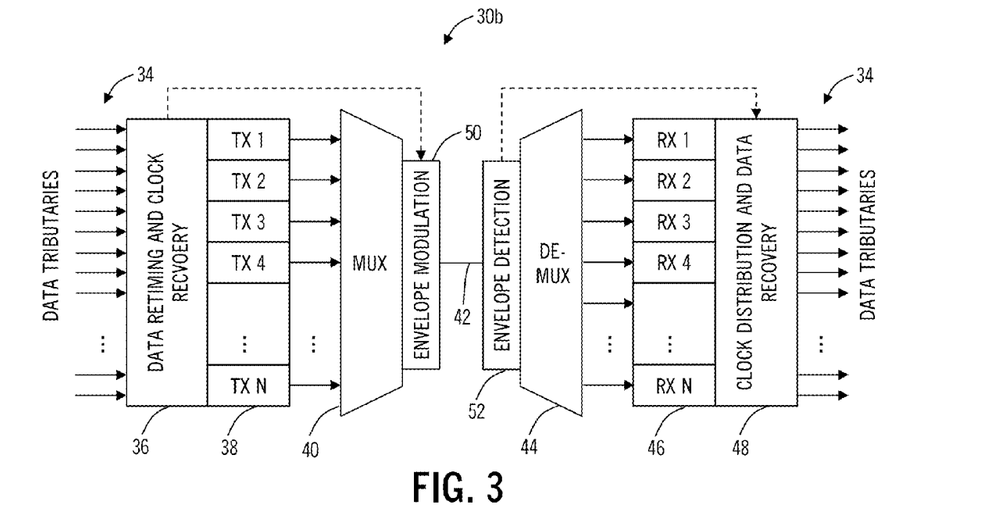
FIG. 3 is a block diagram of a second exemplary embodiment of an optical transceiver with an optical clock superimposed as an external small-index modulation of the overall intensity envelope of the whole bound channel.
Figure 4:
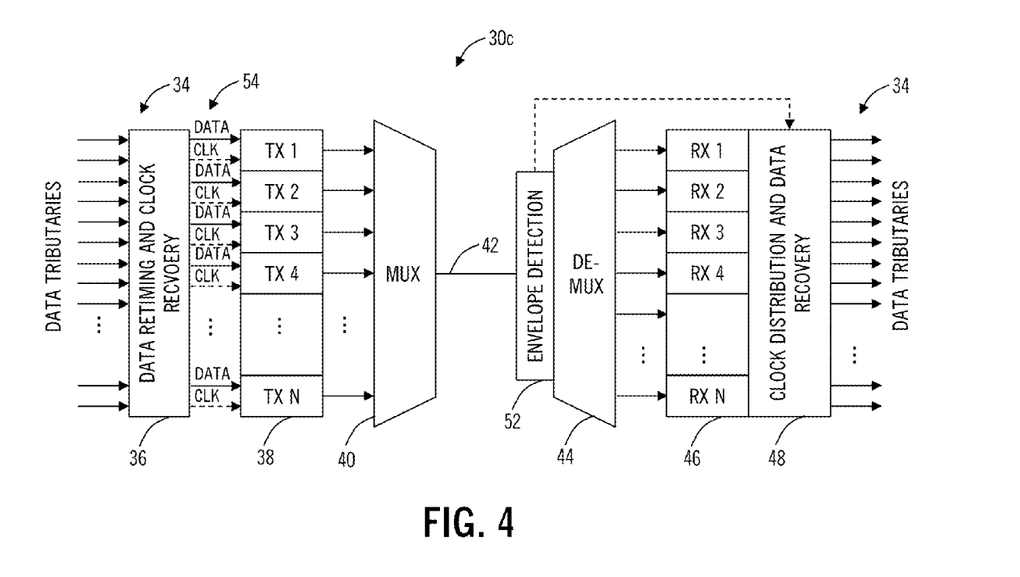
FIG. 4 is a block diagram a third exemplary embodiment of an optical transceiver with an optical clock superimposed as an internal small-index modulation of the overall intensity envelope of the whole bound channel.

Referring to FIGS. 2-4, in various exemplary embodiments, block diagrams illustrate optical transceivers 30a, 30b, 30c with channel binding and optimized system design achieved by simplifying clocking architecture and boosting the direct-detect receiver sensitivity. FIGS. 2-4 show an optimized and improved architectural design of WDM optical highly parallelized transceiver with bound optical channels, and a direct detect signal receiver. There are several options for generating an optical clock signal at the transmitter such as, for example, a separate wavelength channel (FIG. 2), external additional modulation on one or more data channels (FIG. 3), or internal modulation on one or more data channels (FIG. 4). FIG. 2 illustrates a first exemplary embodiment of an optical transceiver 30a with a clock forwarded through a separate clock WDM channel 32 (formed be a clock transmitter 32a and a clock receiver 32b). FIG. 3 illustrates a second exemplary embodiment of an optical transceiver 30b with an optical clock superimposed as an external small-index modulation of the overall intensity envelope of the whole bound channel. FIG. 4 illustrates a third exemplary embodiment of an optical transceiver 30c with an optical clock superimposed as an internal small-index modulation of the overall intensity envelope of the whole bound channel. Thus, each of the optical transceivers 30a, 30b, 30c employ a different technique to convey the optical clock between the transmitter site and the receiver site; note, other embodiments are also contemplated herein.

The optical transceivers 30a, 30b, 30c include N data tributaries 34 which are parts or segments of a composite signal, i.e. the data tributaries 34 are optically bound channels. That is, the optical transceivers 30a, 30b, 30c are bound-channel modules. Unlike in the optical transceiver 10, the individual data tributaries 34 are not necessarily tied to a certain transmitted channel, but instead can be re-distributed between the channels for the purpose of electrical routing. The data tributaries 34 form parts or segments, which can be denoted as $Y_1$, $Y_2, \ldots, Y_N$ and that collectively form a composite line side signal, X, where $Y_1+Y_2+ \ldots +Y_N=X$. For example, the individual optical channels can be optically bound together as 4×25 G (four of them), 10×10 G (ten of them), 16×25 G (sixteen of them), 40×10 G (forty of them), 40×25 G (forty of them), 100×10 G (hundred of them), etc. The optical transceivers 30a, 30b, 30c include a data retiming and clock recovery (DRCR) circuitry 36 receiving each of the data tributaries 34. The DRCR circuitry 36 is configured to generate a clock from the data tributaries 34 for forwarding along with each of the data tributaries 34.

The optical transceivers 30a, 30b, 30c generate, via the DRCR circuitry 36, a clock signal common to all the bound channels at the transmitter. It can be either at the same rate as the data tributaries 34 or at a rational fraction sub-harmonic frequency, i.e. K/L multiplier, where K and L are integers. This common clock can be recovered at the receiver using any number of standard approaches, including ones based on a stable reference oscillator and a phase lock loop (PLL). The transmitted optical clock can have very low modulation depth compared to the data signals, due to its narrow bandwidth. This clock signal can be transmitted on a separate wavelength (FIG. 2), or can be superimposed onto the existing data carrying signal (FIGS. 3-4).

The optical transceivers 30a, 30b, 30c include N transmitters 38, one for each of the N data tributaries 34. The transmitters 38 have a transmission format that can be intensity modulated such as OOK or Duobinary, or Phase Modulated such as Differential PSK, with the important requirement of a direct-detect receiver amenable to an integrate-and-dump implementation. Common co-location of all the individual channel transmitters 38 within the same transceiver 30a, 30b, 30c at the transmitter terminal and accordingly, co-location of all the same individual channel receivers within the same transceiver 30a, 30b, 30c at the receiver terminal allows the centralized clock recovery and distribution on both transmitter and receiver sites. By optically forwarding the clock from the transmitter terminal to the receiver terminal, the mesochronous—when the receiver clock has exactly the same frequency as transmitter's and only fixed phase adjustments are needed for individual receivers—synchronization of the receivers is easily achieved.

The N transmitters 38 are each coupled to a multiplexer 40 which combines wavelengths from each of the N transmitters 38 and transmits them on a link 42. The multiplexer 40 can include a WDM filter, DWDM filter, CWDM filter, coupler, etc. The link 42 terminates at a demultiplexer 44 which splits the wavelengths from each of the N transmitters 38 and transmits each to an associated receiver 46, i.e. N receivers 46, which converts an optical signal to an electrical signal and provides an output to a clock distribution and data recovery (CDDR) circuitry 48 which provides each of the data tributaries 34. In each of the optical transceivers 30a, 30b, 30c, the clock from the transmit site is provided directly over the link 42 to the receive site such that clock is available prior to data recovery.

It is important to emphasize the fact that mesochronous synchronization of the clock at the receiver site does not exhibit any slow clock phase drift due to the frequency difference between transmitter and receiver clock because there is none: a receiver clock has the same frequency as a transmitter clock. Further, data timing wander induced by path variations such as fiber temperature changes is exactly tracked by the clock traversing the same link 42. This fact greatly simplifies the design and implementation of the receiver synchronization: only fixed phase adjustments are needed for individual clock recipients, which is easily accomplished by standard digital delay techniques and does not involve any need in VCOs and PLLs for clock frequency recovery (the former implementation) or greatly simplifies their implementation as well, due to robustness of the seed clock frequency.

With the optical transceiver and method, massive parallelized integration of photonic transmitters and receivers opens the opportunity for wide implementation of low cost optical bound-channels suitable for short reach, data center and metro-type oriented applications. The co-location of all the channel transmitters 38 and receivers 46 at the same transmitting/receiving terminals opens opportunity to generate and share common clocks for all of them—both at the transmit and receive sides. Moreover, optically forwarding the clock from transmit side to receive side makes it possible to create the clocking environment which is mesochronous in nature—when the receiver clock has exactly the same frequency as transmitter's, hence not exhibiting any slow phase drift due to the frequency difference between transmitter and receiver clock, and only fixed phase adjustments are needed for individual clock recipients, the goal easily achievable by simple digital delay-line synchronizers, rendering VCO-based PLL unnecessary.

One of the key features of the optical transceiver and method is a clock-forwarding architecture. By forwarding the designated clock signal from the transmit side to the receive side the receiver clocking architecture is made mesochronous by nature, when clock receiver clock frequency is exactly the same as transmitters and only fixed phase adjustments are needed for individual clocked receivers to keep proper timing alignment relative to the symbol interval. The task of clock's phase adjustment is relatively simple and can be easily accomplished by standard digital delay-line synchronizers. The clock-forwarding aspect of the optical transceiver and method is based on common co-location of all channel transmitters 38 on the same module at the transmit side and accordingly, co-location of all corresponding channel receivers 46 on the same module at the receive side. This attribute of bound channel assures a common optical path, and allows optimization of both transmitter and receiver clocking architecture. At the transmit side, all the data tributaries 34 are used for global synchronization of all the channel transmitters 38 with clock common for the whole transmitter module. Subsequently, at the receive side, the advantage of global synchronization of all the transmitters 38 allows for clocking architecture using common clock recovery and centralized clock distribution.

With a readily available forwarded clock at the receive side, it becomes possible to take advantage of higher sensitivity of integrate-and-dump optical receivers. In an exemplary embodiment, the N receivers 46 include integrate-and-dump optical receivers. Integrate-and-dump receivers are described, for example, in: R. P. Jindal, "Silicon MOS amplifier operation in the integrate and dump mode for gigahertz band lightwave communication systems," Journal of Lightwave Technology, vol. 8, no. 7, pp. 1023-1026, July 1990; S. Sidiropoulus and M. Horowitz, "Current Integrating Receivers for High Speed System Interconnects," IEEE Custom Integrated Circuits Conference—CICC, May, 1995; A. Emami-Neyestanak, et al., "A 1.6 Gb/s, 3 mW CMOS Receiver for Optical Communication," Symposium on VLSI Circuits—VLSIC, 2002, pp. 84-88; A. Emami-Neyestanak, et al., "CMOS Transceiver with Baud Rate Clock Recovery for Optical Interconnects," Symposium on VLSI Circuits—VLSIC, 2004, pp. 410-413; S. Palermo, et al., "A 90 nm CMOS 16 Gb/s Transceiver for Optical Interconnects," IEEE Journal of Solid-State Circuit, vol. 43, no. 5, pp. 1235-1246, May 2008; M. Georgas, at al., "Addressing link-level design tradeoffs for integrated photonics interconnects," IEEE Custom Integrated Circuits Conference—CICC, 2011; M. Georgas, at al., "A monolithically-integrated optical receiver in standard 45-nm SOI," IEEE Journal of Solid-State Circuit, vol. 47, no. 7, pp. 1693-1702, May 2012; and T. D. Gathman and J. F. Buckwalter, "A 45-nm SOI CMOS Integrate-and-Dump Optical Sampling Receiver," IEEE Transactions on Circuits and Systems—I: Regular Papers, vol. 60, no. 2, February 2013, the contents of each are incorporated by reference herein.

Integrate-and-dump optical receivers are known to be able to provide optimum SNR, typically several dB better than other types of receivers, the nearest contender being a TIA-based one, but need an external clock for proper operation. The projected advantages of integrate-and-dump receiver are twofold. First, it acts as integrate-and-dump post-detection filter, which is known to have several advantages compared to a low pass filter (LPF), being it post-TIA LPF or frequency discriminating transfer function of the TIA itself. Integrate-and-dump filters can reduce the degradation caused by certain kinds of timing jitter and introduce very little intersymbol interference even at full bit time integration, which is equivalent to the tight noise filtering down to the half baud rate frequency. A second advantage of integrate-and-dump optical receivers over the TIA-based ones stems from elimination of a noisy transimpedance resistor and most of the active component in the TIA front-end, hence reducing the amount of receiver electrical noise presented to the post-detection filter to begin with. Lower electrical noise levels of integrate-and-dump receivers, combined with their extraordinary noise filtering capabilities make them extra sensitive alternative to the more power wasteful and bandwidth hungry TIA-based implementation. The additional performance gain can be used to provide corresponding power reduction in the overall implementation, as for example by lowering the required laser power. The optical transceiver and method optimizes system design of WDM highly parallelized transceivers with optical bound channels by simplifying clocking architecture and boosting receiver sensitivity. With application of photonic integration technology, highly parallelized transmitter and receiver arrays can be mass produced at low cost, making high-capacity point-point optical links much more feasible. Hence, simplified, efficient and cost effective WDM optical bound-channels disclosed in current invention can find wide usage in short reach chip-chip, board-board, data center, and metro-type applications In FIG. 2, the optical transceiver 30a includes a designated clock WDM channel transmitter 32b for forwarding the optical clock signal by means of designated optical WDM clock carrying channel, which is optically multiplexed together with the rest of information carrying optical channels. The optical clocking signal at data baud rate frequency can be generated by the standard channel transmitter as an alternating sequence of ones and zeros at double data baud rate. If alternating ones and zeros are transmitted at a data baud rate, then frequency of transmitted optical clock is equal to half the symbol rate frequency. Additionally, the optical clock signal can also be transmitted at any low frequency K/L rational fraction sub-harmonic of the fundamental clock frequency, where K and L are integers. At the receive side, the received optical clock channel is de-multiplexed and detected by a designated clock receiver 32b. The clock receiver 32b would generally be simpler, cheaper and more sensitive than the data receivers 46. That is, the designated clock receiver can be a low-power, low-complexity clock signal receiver. The received clock is then filtered out and further processed for distribution in accordance to the standard mesochronous clock recovery techniques, involving clock frequency multiplication if necessary and final clock phase adjustments for individual clocked receivers.

In FIG. 3, the optical clock signal can be superposed on an optical bound-channel through small-index modulation of the total intensity envelope of one or more of the data channels. Specifically, the optical transceiver 30b includes an envelope modulator 50 coupled to the DRCR circuitry 36 and located after the multiplexer 40. The envelope modulator 50 can perform external small-index modulation of the overall intensity envelope of the bound-channel at clock sub-harmonic. This can be accomplished by applying the clock signal (shown as dashed arrow) to a polychromatic intensity modulator (for example, an acousto-optic modulator, a broadband Semiconductor Optical Amplifier (SOA), or similar) after the optical multiplexer 40. The small-index sinusoidal intensity modulation of the multiplexed optical bound channel should be performed at low sub-harmonics of the fundamental clock ranging in frequency from few MHz to tens of MHz, depending on distance, fiber type, spectral width and location of the bound channel within the transparency window of the optical fiber, to prevent detrimental effect of walk-off of optical clocks between the channels constituting the optical bound channel due to group velocity dispersion in optical fiber.

At the receive side, the optical transceiver 30b includes an envelope detector 52 that can tap out a small amount of overall optical power and detect the optical clock signal with a narrowband and highly sensitive clock photodetector. After filtering and appropriate noise-suppression, the extracted sinusoidal clock sub-harmonic can be used as source of seed frequency for the generation of a mesochronous clock at fundamental frequency. The rest of the clock recovery and distribution architecture is similar to the implementation involving a separate WDM clock channel of the optical transceiver 30a.

In FIG. 4, similarly to external modulation of the optical transceiver 30b, an internal modulation technique can be used for superimposing clock on the intensity envelope of the optical bound channel, as illustrated in FIG. 4 for the optical transceiver 30c. Internal intensity envelope modulation can be accomplished by small index modulation of the optical power of individual channels before the optical multiplexing 40, i.e. via the transmitters 38. In this implementation, rational fraction K/L sub-harmonic electrical clock signals are supplied to the individual transmitters 38 as shown by dashed arrows, where K and L are integers. There are several techniques which would allow placing small intensity modulation on output of individual channel transmitters 38. For example, adding a small sinusoidal modulating current to the DC bias current powering channel laser sources. Another way is to modulate the electrical output of the modulator driver with small index sinusoidal signal, so modulated driving voltage applied to the electrodes of external intensity modulator (of electro-absorption or Mach-Zander type, for example) results in sinusoidal modulation of the optical channel power provided that minimum transmission state of a modulator is saturated, while maximum transmission state is not. The electrical modulation of the driver output voltage is easily achievable with voltage controlled PIN attenuators or by controlling the bias current source of the differential amplifier stage with the bandwidth of at least tens of MHz. Similar results can be obtained by adding sub-harmonic sinusoidal modulating signal directly either to the modulating or DC biasing voltage applied to the modulator electrodes.

An advantage of the internal method of intensity envelope modulation is that it is performed on individual channels and consequently phase of modulating sinusoids can be tailored for individual channel transmitters according to their wavelength, thus pre-compensating for the detrimental effect of walk-off of optical clocks between the channels constituting the optical bound channel due to group velocity dispersion in optical fiber. Further, the various techniques for clock forwarding in the optical transceivers 30a, 30b, 30c are presented for illustration purposes, and those of ordinary skill in the art will recognize other techniques are contemplated as well.

Figure 5:
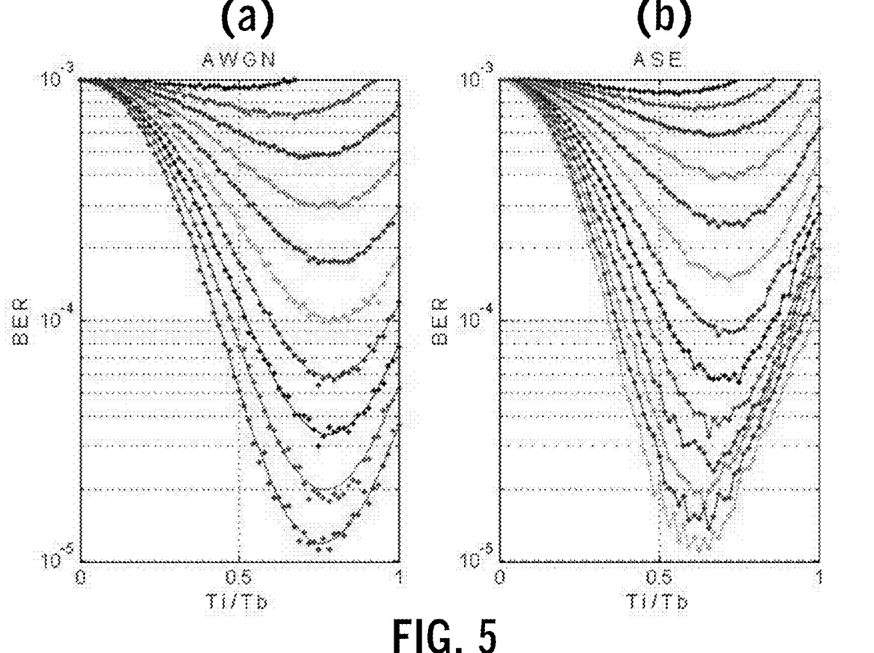
FIG. 5 is a graph of BER dependence from the integration time for integrate-and-dump optical receivers.
Figure 6:
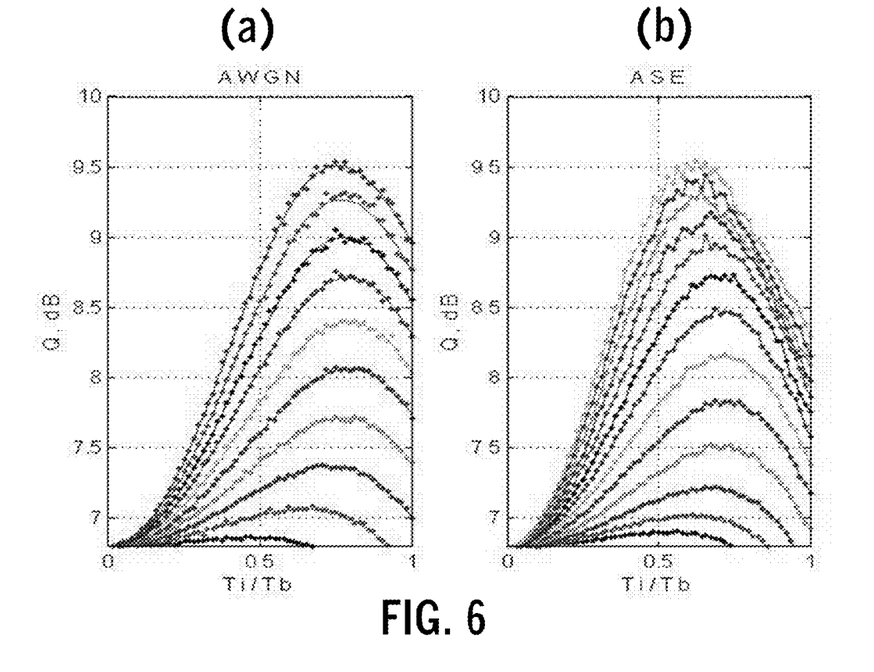
FIG. 6 is a graph of Q-factor dependence from the integration time for integrate-and-dump optical receivers.

Referring to FIGS. 5-6, in an exemplary embodiment, graphs illustrate bit error rate (BER) dependence from the integration time (FIG. 5) and Q-factor dependence from the integration time (FIG. 6) for integrate-and-dump optical receivers. With respect to the integrating receiver aspect of the optical transceiver and method, integrate-and-dump receiver integrating photo current for a full bit period is an example of a matched filter optimized for detection of square wave pulses. This situation is typical for high speed data transmission, where rise and fall time of a pulse includes a small portion of bit period, rendering this type of transmission as bandwidth excessive. Modern broadband optical communications use more bandwidth efficient pulse shaping due to bandwidth restrictions encountered at the frontier of data transmission rate.

One of the most common representations of a bandwidth limited pulse is a raised cosine shaped pulse with unity roll-off factor. With its 10%-90% rise/fall time constituting 60% of bit period it just manages the smooth transition between high and low voltage levels in one bit period. Being far from bandwidth excessive, optical multi-gigabit transmission raised cosine-like pulses are not exactly optimal for the bit-time integration. To investigate the effect of the limited bandwidth and raised cosine shape of the multi-gigabit optical pulse on the filtering quality of the integrate-and-dump receiver, BER (FIG. 5) and related Q-factor (FIG. 6) were calculated for additive white Gaussian noise and multiplicative optical amplified stimulated emission (ASE) noise depending on which fraction of the bit period Tb integration time Ti constitutes. FIG. 5 includes AWGN: Monte Carlo simulated (dots) and modeled analytically (solid lines) in FIG. 5(a); and ASE: Monte Carlo simulations in FIG. 5(b).

Noise levels were chosen so that very short integration time (Ti/Tb≈0; case of single sample at the center of the bit) results in benchmark BER=$10^{-3}$. Multiple curves are parameterized by the variable value of noise bandwidth. In case of AWGN noise bandwidth varies in 0.1 steps from 0.7 baud rate to 1.6 from top of the FIG. 5a to the bottom. It is clearly indicative that the integrate-and-dump receiver manages to eliminate excessive noise from under the bandwidth limited raised cosine shaped signal, all but with shorter optimal integration time equal about 75% of a bit period and never exceeding 80% of it. Multiplicative ASE noise in FIG. 5b has electrical bandwidth from 0.7 baud rate through 1.9 baud rate (similarly stepped 0.1 baud rate top to bottom). In this case as well optimal BER is achieved at shorter than bit period integration times.

FIG. 6 includes AWGN: Monte Carlo simulated (dots) and modeled analytically (solid lines) in FIG. 6(a); and ASE: Monte Carlo simulations in FIG. 6(b) by obtaining Q-factor data from the BER data in FIG. 5 using an inverse complimentary error function. Note that the same parameterization of the Q-factor curves now runs from bottom to the top of the figures. Similarly to the BER drop in FIG. 5, Q-factor was increased accordingly at optimized integration time Ti<Tb. This investigation shows that the integrate-and-dump receiver is capable of eliminating the excessive noise from under the bandwidth limited raised cosine shaped signal and substantially reduce the BER in spite of uniform window filter not being exactly a match to the raised cosine pulse. Optimal integration time to achieve minimum BER is about 75% of bit period, conveniently providing sufficient time for sampling the value of the integrated current and resetting the integrator by discharging the integrating capacitor during the remaining 25% of a bit period, hence eliminating the need for extremely short dumping pulse or, alternatively, use of wasteful parallel time-interleaved integrate-and-dump architecture.

In case of ASE-prevailing multiplicative noise characteristic for the optically amplified links, the advantage of the integrate-and-dump receiver is confined to the above illustrated filtering capabilities, because neither TIA nor integrate-and-dump receivers contribute to this type of noise and only spectrally shape it when it is presented at the EO front end. Situation differs in the case when only additive electric receiver noise is present, like in non-amplified single-hop fiber optic links, such as the focus in intra-office interconnects. In addition to the exceptional noise filtering characteristics of the integrate-and-dump receiver, its much lower-noise electronics further improves sensitivity. Elimination of noisy transimpedance resistors and most of the active components constituting the TIA front-end is reducing the amount of receiver electrical noise, which has spectral density in range of few tens of pA/√Hz for state of the art high speed TIAs.

The main difference between the TIA and integrate-and-dump receivers is in the mechanism of OE intensity-to-voltage conversion: while TIA generates detected voltage by multiplying photocurrent by transimpedance resistance, integrate-and-dump receiver does it by intermittently charging and discharging the capacitor including photodiode capacitance and parasitic capacitance of the electrical connections. Equivalent "transimpedance" of an integrate-and-dump receiver is given as:

$$R = \frac{T_i}{C},$$

where $T_i$ is integration time (i.e. 75% of symbol period), and C is total capacitance.

For example, state of the art photodiode with combined capacitance of 20 fF is capable of the same photo-current to voltage conversion efficiency as if by equivalent 1400Ω transimpedance resistor, while integrating it during 75% of every 28 Gbps bit period. The equivalent transimpedance resistance value for the integrate-and-dump receiver in this example is on par or even exceeds that of modern TIAs. The only integrate-and-dump input current noise component to be compared with the input referred current noise of the TIA is that of a photodiode, i.e. dark current shot noise. Even maximally high dark current (1.5 µA) of modern state of the art Germanium waveguide photo-diodes would generate current noise with spectral density under 0.7 pA/√Hz. This is why dark current contribution to the input current noise is commonly found negligible compared to front-end input current and voltage noise—both in TIA and integrate-and-dump receivers.

Figure 7:
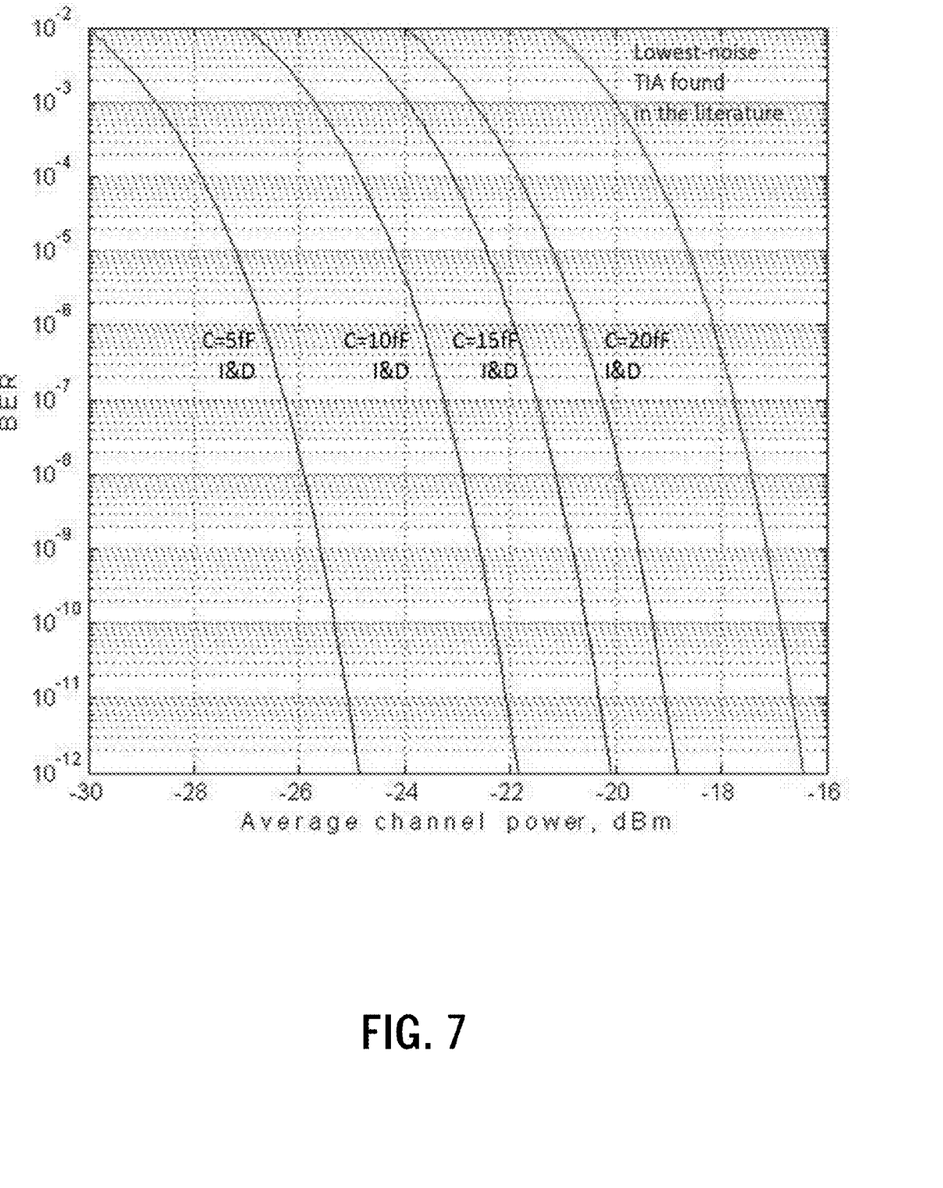
FIG. 7 is a graph of 28 Gbps non-return-to-zero (NRZ) BER versus average optical channel power for integrate-and-dump optical receivers as compared to the state of the art TIA.

Since simple capacitive integrator followed by the buffer is taking place of the TIA front end and is assuming its functionality, the following voltage gain stages are similar to both integrate-and-dump and TIA designs and their contribution to the signal corruption is similar. Hence comparison of the noise characteristics of TIA and integrate-and-dump receivers will be limited to the electrical noise levels of the corresponding front-ends: TIA stage in case of TIA based receiver and buffer stage in case of an integrate-and-dump receiver. Calculated BER versus average optical channel power is shown in FIG. 7. FIG. 7 is a graph of 28 Gbps NRZ BER versus average optical channel power for an integrate-and-dump receiver (photo-diode capacitance from left to right is 5 fF, 10 fF, 15 fF, and 20 fF) and TIA (far right) receiver.

For calculations of input voltage noise of the integrate-and-dump buffer voltage noise spectral density of 8.7 nV/√Hz was used based on S. Palermo, et al., "A 90 nm CMOS 16 Gb/s Transceiver for Optical Interconnects," IEEE Journal of Solid-State Circuit, vol. 43, no. 5, pp. 1235-1246, May 2008. State of the art modern TIA (see, e.g., T. Chou, S. H. Huang, Z. H. Hong, and W. Z. Chen, "A 40 Gbps Optical Receiver Analog Front-End in 65 nm CMOS", International Symposium on Circuits and Systems (ISCAS), May 2012) with lowest known input current noise density of 14 pA/√Hz was used for comparison. In both cases photodiode responsivity 0.7 A/W and noise bandwidth 26 GHz were assumed. Photodiode capacitances of the integrate-and-dump receiver vary from 5 fF to 20 fF from leftmost curve to next to rightmost curve in steps of 5 fF, well within the range of C. T. DeRose, at al., "Ultra compact 45 GHz CMOS compatible Germanium waveguide photodiode with low dark current," Optics Express, vol. 19, no 25, pp. 24897-24904, 5 Dec. 2011. The very rightmost curve corresponds to the state of the art TIA with the lowest noise found in the literature.

Lower electrical noise levels of integrate-and-dump receiver front-end, combined with its excellent noise filtering capabilities makes it extra sensitive alternative to the more wasteful TIA-based implementation. Integrate-and-dump photo detection technique is not limited to binary direct-detect format alone. It is possible to use integrate-and-dump receivers with multi-level power amplitude modulation formatted signals, with obvious consequences of necessity to share the receiver dynamic range between multiple mapped symbols, which coincidentally is eased by an increase in receiver dynamic range thanks to boosted sensitivity.

Figure 8:
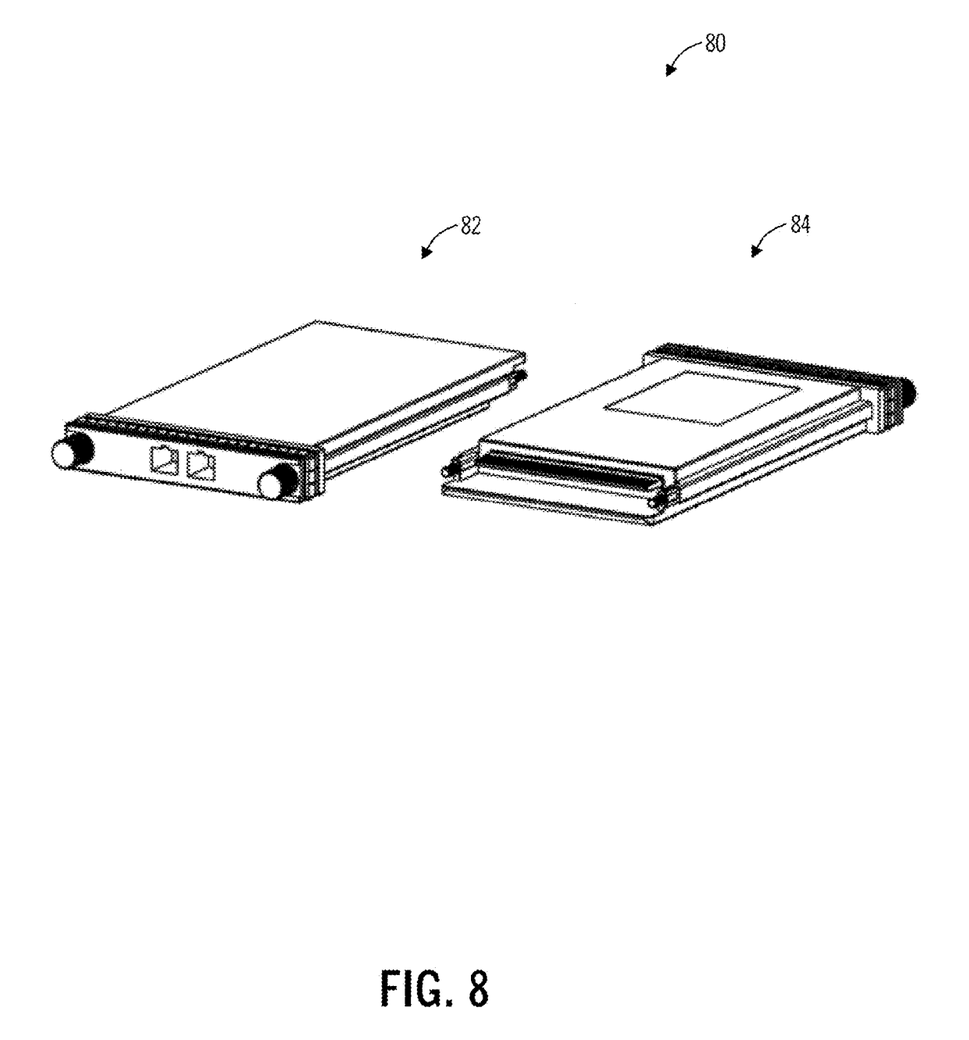
FIG. 8 is a perspective diagram of a CFP module in a front view and a rear view.

Referring to FIG. 8, in an exemplary embodiment, a perspective diagram illustrates a CFP module 80 in a front view 82 and a rear view 84. The present disclosure can incorporate the functionality described herein in 40 Gbps and 100 Gbps (as well as future 400 Gbps, 1 Tbps, etc.) optical transceivers such as CFP and variants thereof (e.g., CFP2, CFP4, CDFP, CXP), MSA-100GLH, CCRx, QSFP and variants thereof (e.g., QSFP+, QSFP2), 10×10, and the like. The CFP module 80 is compliant to the CFP MSA Rev. 1.4 (June 2010) (available at www.cfp-msa.org and incorporated by reference herein). The CFP MSA defines a hot-pluggable optical transceiver form factor to enable 40 Gbps and 100 Gbps applications, including next-generation High Speed Ethernet (40 GbE and 100 GbE). The electrical interface may include a nominal signaling lane rate of 10 Gbit/s per lane with various electrical interface specifications such as CAUI, XLAUI, OTL4.10, OTL3.4, and STL256.4. Other variants of CFP may include CFP2 which uses a signaling lane rate of 25 Gbit/s per lane. For example, the CFP MSA has an electrical interface of 4×10 G (XLAUI) or 10×10 G (CAUI), the CFP2 MSA has an electrical interface of 4×25 G (CAUI2 or CPPI2). Another variant of CFP may include CDFP which uses a signaling lane rate of 25 Gbps per lane and has an electrical interface of 16×25 G providing 400 G. The CXP MSA was created to satisfy the high-density requirements of the data center, targeting parallel interconnections for 12×QDR InfiniBand (120 Gbps), 100 GbE, and proprietary links between systems collocated in the same facility. The InfiniBand Trade Association (www.infinibandta.org) is currently standardizing the CXP.

The OIF MSA-100GLH Multisource Agreement (IA) provides a 100 G Long-Haul DWDM Transmission Module—Electromechanical (MSA-100GLH) for optical line interface applications. The OIF MSA-100GLH (available at www.oiforum.com/public/documents/OIF-MSA-100GLH-EM-01.0.pdf) specifically addresses 100 G Polarization Multiplexed Quadrature Phase Shift Keying (PM-QPSK) long-haul DWDM, but the MSA strives to remain modulation format and data rate agnostic whenever practical to maximize applicability to future market requirements. The interface IC(s) and module electrical interface are generically specified to allow vendor specific customization of multilane "M-lane" ~11 Gbit/s interfaces. Module electrical interfaces include but are not limited to the following: a) Simple bit multiplex; b) OTL4.10 [I2]; c) SFI-S [I3]; and d) OTL3.4 [I2] (for 40 G applications). The QSFP MSA and variants (QSFP+, QSFP2, etc.) defines electrical interfaces, management interfaces, optical interfaces, mechanical specifications and the like for a multimode laser providing 40 G and 100 G clients. Specifically, QSFP provides four electrical interfaces at 10 G (XLPPI) and four optical interfaces at 10 G. QSFP2 provides 100 G via four 25 G interfaces. The MSA for QSFP may be accessed at ftp.seagate.com/sff/INF-8438.PDF.

The 10×10 MSA provides a low cost 100 GbE solution over single mode fiber using 10×10 G, i.e. ten 10 G signals in parallel. Specifically, the 10×10 MSA is available at www.10x10msa.org. The 10×10 MSA is compliant with IEEE 802.3ba CAUI, MLD, MAC structure, and the CFP MSA. Of note, the 10×10 MSA utilizes the same form factor as CFP for electrical, mechanical, and firmware interfaces. Those of ordinary skill in the art will recognize that CFP and variants thereof (e.g., future CFP2, CDFP, CXP), MSA-100GLH, CCRx, QSFP and variants thereof (e.g., future QSFP+, QSFP2), 10×10, etc. are presented as exemplary embodiments, and the present disclosure contemplates use of with any particular MSA agreement including newly defined agreements. Specifically, the aforementioned MSAs all relate to interconnect applications that could make use of the optical transceiver 30a, 30b, 30c. Each of these MSAs include optically bound channels.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. An optical transceiver, comprising:
   N transmitters each transmitting one of N transmitted optically bound channels using intensity modulation;
   a clock forwarding mechanism to transmit a transmitted optical clock signal to an opposing optical receiver;
   N receivers each receiving one of N received optically bound channels; and
   a clock recovery mechanism to receive a received optical clock signal from the opposing optical transmitter;
   wherein the N receivers comprise integrate-and-dump optical receivers that utilize an integration time of about 75% of a bit period providing sufficient time for sampling a value of integrated current and resetting an integrator by discharging an integrating capacitor during the remaining about 25% of the bit period.

2. The optical transceiver of claim 1, further comprising:
   a multiplexer combining the N transmitted optically bound channels from the N transmitters; and
   a demultiplexer splitting N received optically bound channels to the N receivers.

3. The optical transceiver of claim 2, wherein the N transmitters, the clock forwarding mechanism, the N receivers, the clock recovery mechanism, the multiplexer, and the demultiplexer are photonically integrated.

4. The optical transceiver of claim 1, further comprising:
   clock distribution and data recovery circuitry coupled to each of the N receivers and the clock recovery mechanism, wherein the clock distribution and data recovery circuitry is configured to recover the received optical clock prior to performing data recovery.

5. The optical transceiver of claim 1, wherein the clock forwarding mechanism comprises a clock transmitter transmitting the transmitted optical clock signal over a designated clock carrying wavelength; and
   wherein the clock recovery mechanism comprises a clock receiver receiving the received optical clock signal over a designated clock carrying wavelength, wherein the clock receiver is a low-power, low-complexity clock signal receiver relative to the N receivers.

6. The optical transceiver of claim 1, further comprising:
   an envelope detector tapping a portion of overall optical power prior to the N receivers and detecting the received optical clock signal with a narrowband clock photodetector, wherein the received optical clock signal is superimposed as an external or internal modulation of an overall intensity envelope of a whole bound channel from an opposing transceiver.

7. The optical transceiver of claim 1, wherein the transmitted optical clock signal and the received optical clock signal are carried at a much lower sub-harmonic, compared to signal rate of the N transmitters and the N receivers.

8. The optical transceiver of claim 1, wherein the N receivers do not utilize broadband transimpedance amplifiers and data-driven clock recovery.

9. The optical transceiver of claim 1, wherein the N transmitted optically bound channels comprise a composite signal X that is comprised of $Y_1, Y_2, \ldots, Y_N$ parts or segments that are each transmitted on a set of optical carriers on a same optical module by the N transmitters to create a composite line side signal where $Y_1 + Y_2 + \ldots + Y_N = X$.

10. The optical transceiver of claim 1, wherein the optical transceiver comprises one of a CFP, CFP2, CFP4, CDFP, CXP, MSA-100GLH, CCRx, QSFP, QSFP+, QSFP2, or 10×10-compliant module.

11. The optical transceiver of claim 1, wherein the N transmitters utilize any of on-off keying, duobinary, differential phase-shift keying, and multi-level formats.

12. A method, comprising:
    transmitting a composite signal split into N optically bound channels and an optical clock signal associated with the N optically bound channels using intensity modulation;
    receiving the N optically bound channels and the optical clock signal;
    recovering an electrical clock signal from the optical clock signal;
    performing data recovery of the N optically bound channels utilizing the recovered electrical clock signal;
    utilizing an integration time of about 75% of a bit period providing sufficient time for sampling a value of integrated current and resetting an integrator by discharging an integrating capacitor during the remaining about 25% of the bit period;
    transmitting the optical clock signal superimposed as an external or internal modulation of an overall intensity envelope of a whole bound channel; and
    receiving the optical clock signal by tapping a portion of overall optical power and detecting the optical clock signal with a narrowband clock photodetector.

13. The method of claim 12, further comprising:
    transmitting the optical clock signal over a designated clock carrying wavelength; and
    receiving the optical clock signal over the designated clock carrying wavelength with a clock receiver that is a low-power, low-complexity clock signal receiver relative to a data receiver for the N optically bound channels.

14. The method of claim 12, further comprising:
    transmitting the optical clock signal at a much lower sub-harmonic, compared to signal rate of the N optically bound channels.

15. The method of claim 12, further comprising:
    receiving the N optically bound channels with N integrate-and-dump receivers.

16. A photonically integrated system, comprising:
N transmitters each transmitting one of N transmitted optically bound channels using intensity modulation;
a multiplexer combining the N transmitted optically bound channels from the N transmitters;
a clock forwarding mechanism to transmit a transmitted optical clock signal to an opposing optical receiver;
N receivers each receiving one of N received optically bound channels, wherein the N receivers comprise integrate-and-dump optical receivers that utilize an integration time of about 75% of a bit period providing sufficient time for sampling a value of integrated current and resetting an integrator by discharging an integrating capacitor during the remaining about 25% of the bit period;
a demultiplexer splitting the N received optically bound channels to the N receivers;
a clock recovery mechanism to receive a received optical clock signal from the opposing optical transmitter; and
an envelope detector tapping a portion of overall optical power prior to the N receivers and detecting the received optical clock signal with a narrowband clock photodetector, wherein the received optical clock signal is superimposed as an external or internal modulation of an overall intensity envelope of a whole bound channel from an opposing transceiver.

\* \* \* \* \*